United States Patent [19]
Muck et al.

[11] Patent Number: 5,218,928
[45] Date of Patent: Jun. 15, 1993

[54] AVIAN RESTRAINER

[76] Inventors: Kin C. Muck; Helen M. Chan, both of 4437 Greenfield Rd., Bethlehem, Pa. 18017

[21] Appl. No.: 944,289

[22] Filed: Sep. 14, 1992

[51] Int. Cl.$^5$ ............................................. A01K 29/00
[52] U.S. Cl. .................................................. 119/97.1
[58] Field of Search ...................... 119/96, 97.1, 97.2, 119/97.3, 101, 102

[56] References Cited

U.S. PATENT DOCUMENTS

| | | | |
|---|---|---|---|
| 1,008,050 | 11/1911 | Osborn | 119/97.1 |
| 1,609,079 | 3/1926 | Ford | 119/97.1 |
| 1,731,824 | 10/1929 | Mood | 119/97.1 |
| 2,107,484 | 9/1938 | Lesher | 119/97.1 |
| 2,122,731 | 7/1938 | Summers | 119/97.1 |
| 2,188,024 | 1/1940 | Van Meter | 119/97.1 |
| 5,109,801 | 5/1992 | Gahagan | 119/96 |

*Primary Examiner*—Robert P. Swiatek
*Assistant Examiner*—Thomas Price

[57] ABSTRACT

A device for restraining an avian animal, or other small animals, so as to restrict the movements of its body, while leaving its head, legs, and its rear region exposed for various treatments. The restrainer comprises a substantially flat sheet of pliable material, to which are attached a plurality of fastener members, the fastener members having fastening surfaces adapted for releasable attachment to each other, in conjunction with a pliable strap having fastening surface adapted for releasable attachment to the corresponding fastener members on the restrainer. The sheet is folded into an approximate funnel or truncated cone shape with two openings, and retained in this shape by the engagement of the releasable fastener members. It is held above the head of an animal, with the larger opening facing downwards, and rapidly placed over it until its head protrudes out of the smaller opening, the strap is then placed around the bottom or the rear of the animal, and attached at both ends to the corresponding fastener members on the restrainer. The size as well as the shape of the present restrainer are adjustable to accommodate animals of different sizes.

11 Claims, 4 Drawing Sheets

AVIAN RESTRAINER

BACKGROUND OF INVENTION

1. Technical Field

This invention relates generally to a small animal restraining or holding device, and particularly to an avian restrainer device by means of which an avian animal is restrained for various treatments.

2. Description of Prior Art

It is often necessary to restrain an animal during various treatments, to guard against excessive movements and possible injury to the animal as well as to the caretaker. This is particularly so if the animal is frightened or hostile. Many types of small animals, and particularly avian animals, are easily frightened when being manhandled, or when placed in unfamiliar surroundings. They have the tendency to bite, struggle violently, and flap their wings, when held by a caretaker, rendering them very difficult to manage if unrestrained. Accordingly it is desirable to provide a simple, effective, and economical means for the temporary restraint of an avian animal to facilitate its treatment.

Several different means for restraining an avian animal have been proposed previously, albeit mostly for restraining domestic fowls. U.S. Pat. No. 1,609,079 issued to J. H. Ford (1926) provides an inverted symmetrical frusto-conical shape holder, whereby a fowl is lowered into the larger opening of the cone which is held up by support mechanisms, until its legs protrude out of the smaller opening at the bottom. This holder restrains only the fowl's legs and does not restrain its body, so that it is free to flap its wings. U.S. Pat. No. 2,107,484 issued to J. B. Lesher (1938), U.S. Pat. No. 2,122,731 issued to C. Summers (1938), and U.S. Pat. No. 2,319,938 issued to O. D. Markins (1943) all disclosed essentially an inverted frusto-conical or funnel shape holder. A common disadvantage of these inventions is that the cone shape holder cannot be operated as a stand-alone device; various support mechanisms are required to hold it in place. Since the holder is fixed to rather bulky mechanisms, it lacks transportability and maneuverability. A fowl is lowered head first into the holder through its larger opening until its head protrudes out of the bottom smaller opening. The head down position assumed by the fowl when restrained is undesirable for certain treatments, such as the administering of oral medicine or food. Yet another disadvantage is that the size of the holder is fixed and cannot be adjusted to fit fowls of different sizes. U.S. Pat. No. 2,188,024 issued to S. T. Van Meter (1940) discloses a holder which includes a frusto-conical shaped band at one end to receive the fowl's neck and its upper body, and a separate clamping plate to restrain the fowl's legs. The cone shaped band and the legs clamping plate are mounted on a base plate. This invention also suffers from the disadvantage of placing the fowl's head below its body, which is an undesirable position for administering oral medicine. Another disadvantage is that the size of the body restraining cone cannot be adjusted to accommodate animals of different sizes. This holder also lacks transportability and maneuverability since it is mounted to a base plate.

It is, therefore, an object of the present invention to provide a novel device for restraining the body, including wings or upper body limbs, of a small animal, particularly an avian animal, while leaving its head, its legs and the rear region substantially uncovered, for various treatments such as examination, the oral administering of medicine or food, injection, the clipping of nails, the application and removal of leg bands, etc.

It is also an object of the present invention to provide an avian restraining device in the approximate shape of a truncated cone, having a means as part of the device, for preventing the animal from backing out of the restrainer from the larger opening.

A further object of the present invention is to provide an avian restrainer which can be folded from a substantially flat piece of pliable sheet material into approximately a funnel shape or a truncated cone shape holder during use, and can be unfolded after use for easy storage.

It is a further object of the present invention to provide an avian restrainer whose size and shape can be easily adjusted to fit animals of different shapes and sizes.

It is yet another object of the invention to provide an avian restrainer which is easy to apply, and can quickly be removed from the animal being restrained.

It is yet a further object of the invention to provide an avian restrainer which can be used as a stand-alone animal holder which is not required to be fixed to other support mechanisms.

A further object of the invention is to provide an economical and lightweight avian restraining device which when applied, allows the animal to be placed on a table top, or held by hand with its head upwards, downwards and in any other orientations as desired.

Other objects and advantages will be apparent to those skilled in the art who have benefit of the following disclosure.

SUMMARY OF THE INVENTION

The applicants' novel restraining device has been generally designed for the temporary restraint of avian animals, or some other types of small animals. In treating an avian animal, it is often necessary to restrain or restrict the movements of its body, including its wings, while having the head and its rear region uncovered. Having the animal's head and the rear region exposed enable the caretaker to examine the animal about the head and its anal region, and to administer medicine and food, orally as well as via injection. Exposing the legs would allow treatments such as the clipping of nails.

The applicants' restrainer basically comprises a single piece of substantially flat pliable or flexible sheeting material having a substantially elongated shape, a plurality of fastening members with top surfaces adapted for releasable attachment, permanently attached at the back surfaces to the said sheet at various locations, in conjunction with a strap or a band made of a pliable material having an attachment surface which can be releasably attached to the designated fastening members.

The sheet can be made of any pliable material adapted to be bent easily by hand to form an approximate funnel or truncated cone shape. Suitable sheet materials include but are not limited to different types of plastics, leather, woven or non-woven fabrics, laminated fabrics, rubber, metals, and even paper products. In the present preferred embodiment, the sheet material is clear flexible polycarbonate sheeting.

In a preferred embodiment of the present invention, the fastening members with releasable attachment surfaces are provided as the hook-and-loop type fastener strips, such as the type manufactured by VELCRO U.S.A. Inc.

In one preferred embodiment, the present restrainer comprises a rectangular piece of clear plastic polycarbonate sheet with its edges and corners blunted. A first piece of the hook type hook-and-loop fastening system with pressure sensitive adhesive backing is permanently attached to the plastic sheet close to the end of the sheet. Two other pieces of the same hook type fastener system, also with pressure sensitive adhesive backing, are permanently attached to the sheet at appropriate distances from the center of the sheet, and preferably on the same side of the sheet. On the reverse or opposite surface, a piece of the loop type hook-and-loop fastener with pressure sensitive adhesive backing, is permanently attached to the sheet close to the opposite end from the first hook type fastener.

The present restrainer is formed by bending the plastic sheet into a substantially truncated cone shape until the ends of the sheet overlap. The internal size of the truncated cone shape restrainer, and the sizes of its two openings, are dependent on the manner in which the cone is folded, as well as the extent of the overlap of the sheet ends. In general, the larger the overlap, the smaller will be the restrainer and its openings. The sizes of the restrainer openings can be easily varied by varying the extent of the overlap at the sheet ends. After folding the sheet into a truncated cone shape of suitable size, the restrainer is retained in this shape by engaging the hook and loop fastener members at the opposite ends of the sheet. The strap made of compliant material with loop type releasable fastener surface is releasably fastened to the hook type fastener members on the sides of the cone shape restrainer across the larger of the two openings. The purpose of this strap is to provide a means for supporting the rear of the animal being restrained, and to prevent it from backing out of the restrainer. This strap will be referred to as the "rear supporting strap" hereafter.

The applicants' restrainer can be returned to its substantially flat form by undoing or disengaging (i.e. manually pulling apart) the hook and loop fastener members at the overlapping ends of the sheet. When desired, the assembly can again be bent to form another truncated cone shape restrainer by refolding and reengaging the same fastener members.

To restrain an avian animal, one end of the rear supporting strap is first disengaged from the restrainer. The restrainer is held above the animal's head, with the larger opening facing downwards, and rapidly placed over the animal. Once the animal is inside the restrainer, it has the natural tendency to poke its head out of the restrainer through the smaller opening. It is this significant tendency that renders the applicants' restrainer so easy to use. The result is that its head and part of its neck, its tail and legs are exposed, while a substantial portion of its body and its wings are confined within the restrainer. The rear supporting strap is now placed across the rear or the bottom of the animal behind the legs, and attached to the corresponding hook type fastener member on the restrainer. The rear support strap thus serves to prevent the animal from backing out of the restrainer. The animal is of course unable to escape out of the smaller opening since that opening is made smaller than its body size.

In some instances, the use of the rear supporting strap is not absolutely necessary. For example in the temporary restraint of a semi-tame pet bird on a table-top, with the bird sitting in a headup position, the present restrainer can be satisfactorily used without the rear supporting strap, as long as it is not required to lift the bird from the table-top.

The present restrainer is lightweight and economical. It can be used as a stand-alone device which does not need to be fixed or attached to other support mechanisms. It is easy to apply, and can be quickly removed from the animal, either by undoing the rear supporting strap and lifting from the animal, or by undoing the restrainer completely in manually pulling apart the releasable fastening members. The size of the restrainer is adjustable, and its shape can be easily varied to accommodate animals of different shapes and sizes. It can be unfolded after use for convenient storage. It is hygienic, and can be easily cleaned and disinfected. It is transportable and maneuverable, so that the restrained animal can be placed on a table top with its head pointing upwards, or held in any orientation by hand for various treatments.

DETAILED DESCRIPTION OF THE INVENTION

A preferred embodiment of the applicants' avian restrainer will be described with reference to the drawings shown in FIG. 1-5.

Figure 1:
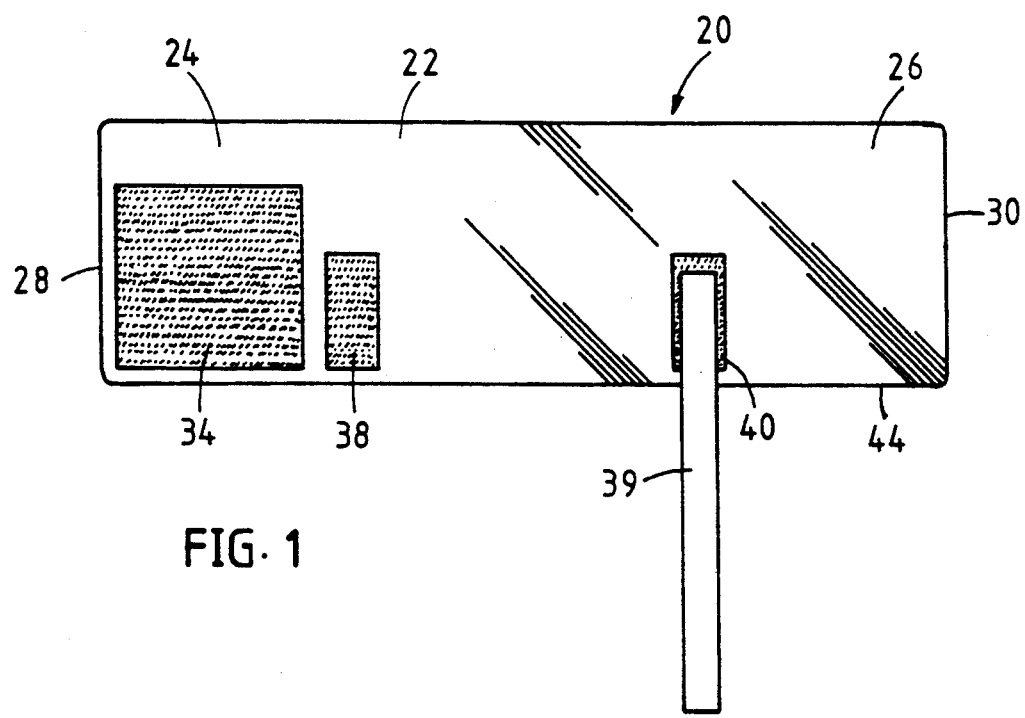
FIG. 1 is a top view of a restrainer assembly of the present invention in its substantially flat unfolded form.
Figure 2:
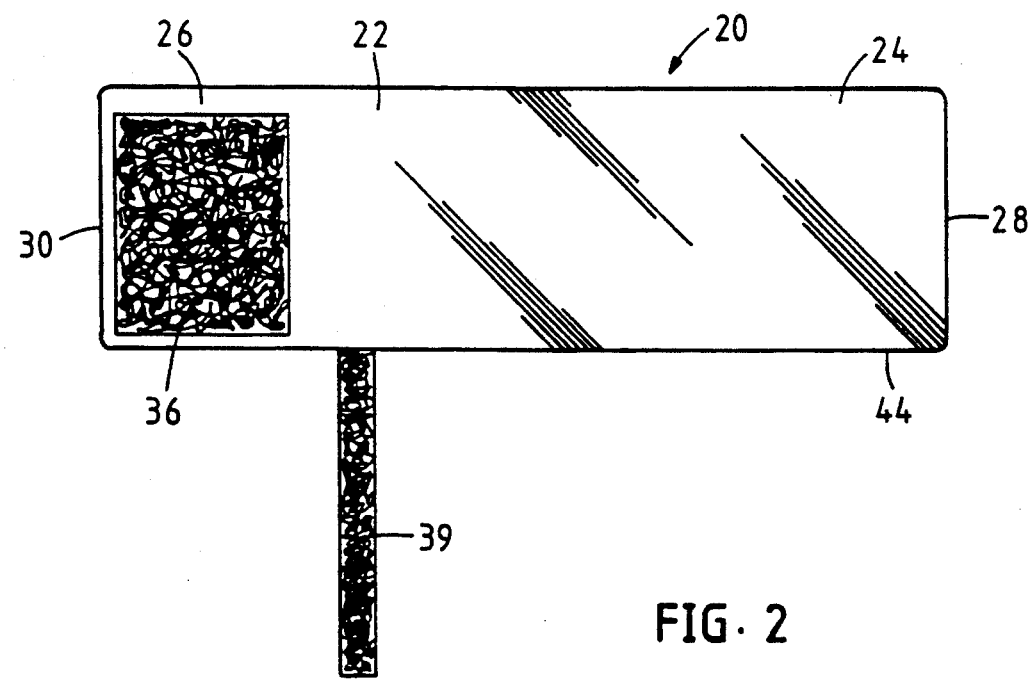
FIG. 2 is a bottom view of the restrainer assembly of FIG. 1.

Referring to FIGS. 1 and 2, restrainer assembly 20 comprises a substantially flat sheet 22 of pliable material having a substantially rectangular shape. Said sheet 22 is adapted to be bent or folded in order to overlap end portions 24 and 26 of sheet 22 at opposite ends 28 and 30, thereby forming sheet 22 into the shape of an approximate truncated cone with two openings, one opening being larger than the other. In the present preferred embodiment, the restrainer sheet is made of fairly thin clear polycarbonate sheeting material.

As shown in FIGS. 1 and 2, restrainer assembly 20 further comprises first fastener member 34, and second fastener member 36, both are permanently attached to said sheet 22 close to the sheet ends 28 and 30 respectively, and on opposite surfaces of sheet 22. Fastener members 34 and 36 have fastening surfaces which are adapted for releasable attachment when engaged to each other. In the present preferred embodiment, the type of releasable fastener members of choice is the hook-and-loop fastener system (e.g. the VELCRO brand fastener strips manufactured by VELCRO USA Inc.). In the present preferred embodiment, fastener member 34 is the hook type, and fastener member 36 is the loop type, both having pressure sensitive adhesive backing for attaching to sheet 22.

Still referring to FIGS. 1 and 2, third fastener member 38, and fourth fastener member 40, both with pressure sensitive adhesive backings, and of the same hook type fastening surface as member 34, are permanently attached to sheet 22. It is preferred that fastener members 38 and 40 be on the same side of sheet 22 as fastener members 34. Fastener members 38 and 40 are placed at a suitable distances from the center of sheet 22, as depicted in the drawings.

The restrainer 20 further comprises a strap 39 which is a strip of the loop type hook-and-loop fastener, as shown in FIGS. 1 and 2. One end of strap 39 is releasably attached to the hook type fastener member 40. Strap 39 is for attaching to fastener members 38 and 40 across the larger opening of the truncated cone shape restrainer to support the rear of a restrained animal. Strap 39 is therefore referred to as the rear supported strap.

Figure 3:
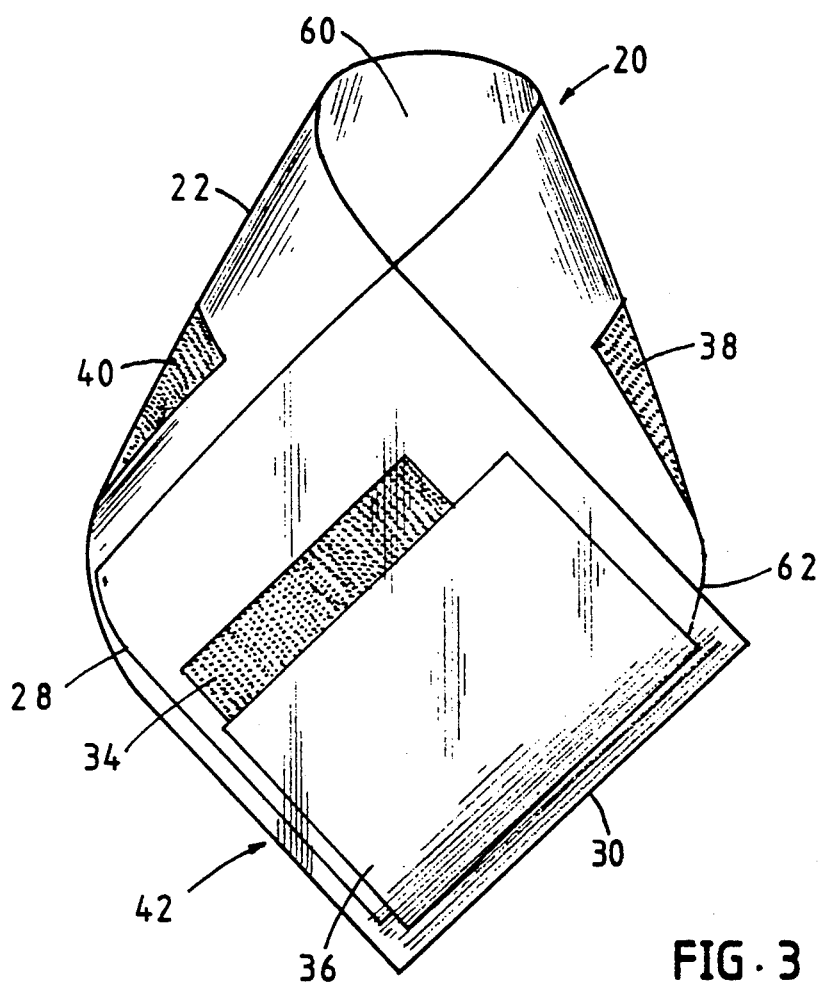
FIG. 3 is a perspective view of the restrainer assembly of FIG. 1 when folded and retained in an approximate truncated cone shape.

The present restrainer 20 is formed by bending or folding sheet 22 into an approximate truncated cone or funnel shape until substantial portions at opposite ends 28 and 30 of sheet 22 overlap, as depicted in FIG. 3. Sheet 22 is preferably folded with the surface having the hook type members, namely 34, 38 and 40 facing outward. Sheet 22 is then retained in the funnel shape by manually engaging the fastener members 34 and 36 against each other.

Figure 4:
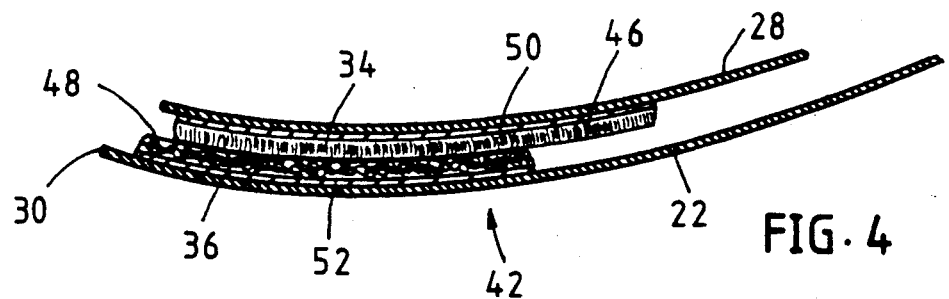
FIG. 4 is a partial end view of the overlapping portions of the restrainer assembly of FIG. 3.

FIG. 4 shows a fastening assembly 42 formed by engaging or pressing together the hook type surface 46 of fastener member 34, and the loop type surface 48 of fastener member 36. Fastener member 34 is permanently attached to sheet 22 by means of a pressure sensitive adhesive layer 50. Similarly, fastener member 36 is permanently attached to sheet 22 by means of pressure sensitive adhesive layer 52.

The overall size and form of the folded funnel shape restrainer 20 is dependent on the extent of the overlap of sheet 22. The internal size of restrainer 20 and the relative sizes of its two openings 60 and 62 can be easily varied by undoing the fastener members 34 and 36, and refolding the sheet 22 until the a desired size is obtained, then re-engaging the fastener members 34 and 36. The fastening assembly 42 is disengaged by manually pulling apart the overlapping fastening members 34 and 36. This feature renders the present restrainer adjustable, so that it can be applied to animals of different sizes.

Figure 5:
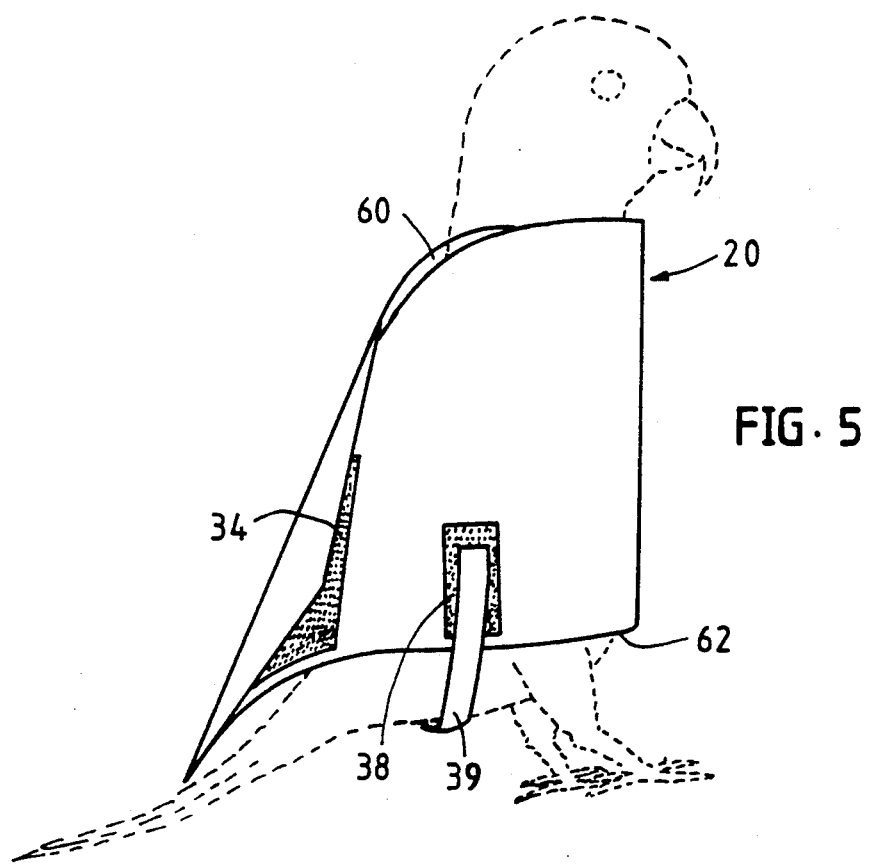
FIG. 5 is a perspective view of the restrainer assembly as applied to an avian animal.

To restrain an avian animal, the folded restrainer assembly 20 as shown in FIG. 3 is held by hand above the head of the animal, with the larger opening 62 facing downwards. The rear supporting strap 39 is attached at one end to fastener member 40. When in position, the restrainer 20 is then rapidly placed over the animal and pushed down to cover the body including the wings. Restrainer 20 is held until the animal pokes its head through the top smaller opening 60. Now the bottom supporting strap 39 with one end already attached to fastener member 40 On sheet 22 (as shown in FIGS. 1 and 2) is placed across the rear of the animal, preferably behind the legs, and fastened to fastener member 38. Strap 39 serves to support the bottom of the animal within the restrainer when it is lifted by hand, and also to prevent the animal from backing out of the restrainer from the bottom opening 62. FIG. 5 shows the animal being restrained with the present restrainer.

As depicted in FIG. 5, only the body of the animal is restrained, leaving its head, its legs and its rear region uncovered. Exposing the head and having the animal in an essentially upright position is desirable for treatments such as examination of the eyes, nostrils, mouth and ears, and also for the administering of oral medicine. Having the rear region exposed is desirable for injection, examination of the anal region, nail clipping etc. The animal can be held by hand in any orientation, or let sit on a table top. When animal is held up by hand, it is kept from backing out of the restrainer by the rear support strap. The present restrainer can be used on animals of different sizes because of its adjustability. The internal size of restrainer 20, as well as the relative sizes of its openings 60 and 62, are adjusted or varied by undoing fastener members 34 and 36, refolding as desired, and re-engaging fastener members 34 and 36.

Figure 6:
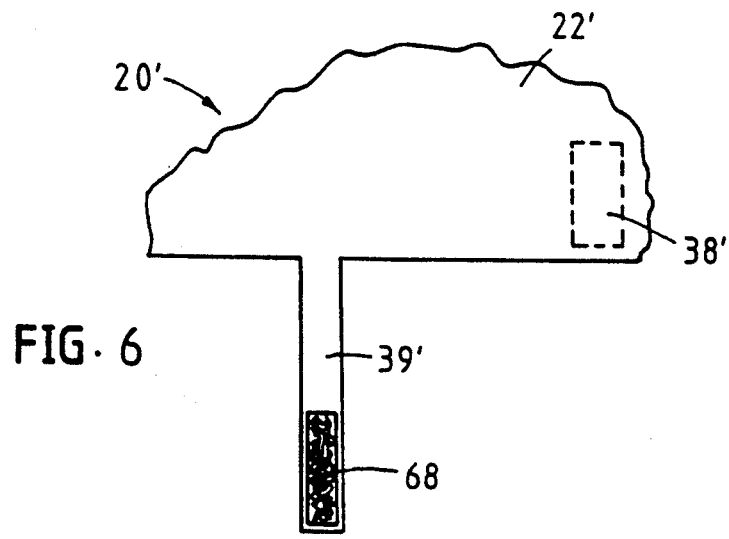
FIG. 6 is a partial view of a restrainer assembly of the present invention with one end of the rear supporting strap permanently attached to the restrainer sheet.

FIG. 6 shows another preferred embodiment 20' of the present invention. One end of the bottom supporting strap 39' is permanently attached to sheet 22', instead of being releasably attached to a fastener member on sheet 22' as described in reference to FIGS. 1-5. The other end of strap 39' has a loop type attachment surface 68 designed for and adapted to releasable attachment to fastener member 38'.

Figure 7:
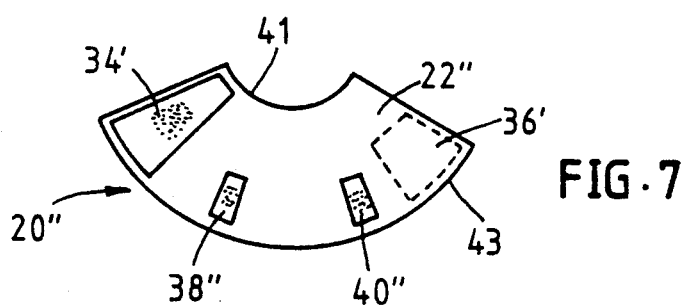
FIG. 7 is a top view of a restrainer of the present invention having curved edges in its flat unfolded form.

FIG. 7 shows yet another embodiment 20" of the present invention. Instead of having an essentially rectangular shape with substantially straight edges, the sheet 22" has curved edges 41 and 43. In this case, when sheet 22" is folded until the end portions having releasable hook type fastener member 34' and loop type fastener member 36', a roughly symmetrical frusto-conical shape restrainer is formed. Also shown in FIG. 7 are the hook type fastener members 38" and 40" for engaging to rear supporting strap 39 (shown in FIG. 1).

Figure 8:
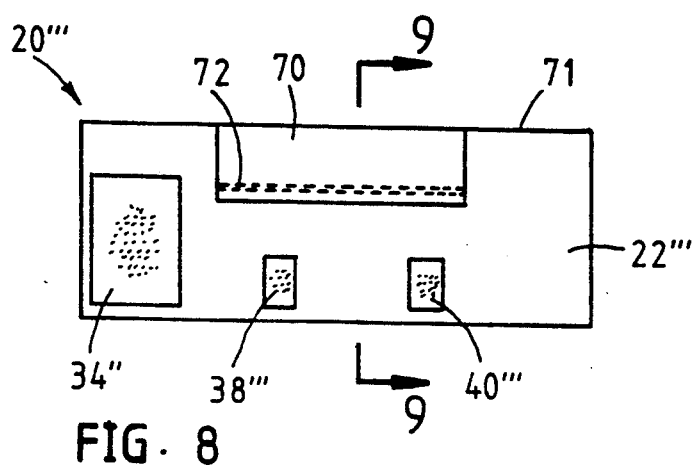
FIG. 8 is a top view of a restrainer of the present invention having reinforcement means.

FIG. 8 shows a top view of yet another embodiment 20''' of the present invention. Sheet 22''' is a piece of soft compliant fabric material. To strengthen the fabric restrainer against damage through biting and chewing by the animal being restrained, said restrainer has reinforcement 70 on the to edge 71 of said sheet. The reinforcement is achieved by bending a portion of sheet 22''' back onto itself, and is held in place by fastening means. In one preferred embodiment of the invention, the fastening means for securing said reinforcement in position are lines of sewing threads 72. Also shown are the releasable fastener members, 34''', 38''' and 40'''. The bottom view of restrainer 20''' is not shown because it is essentially similar to restrainer 20 as shown in FIG. 2.

Figure 9:
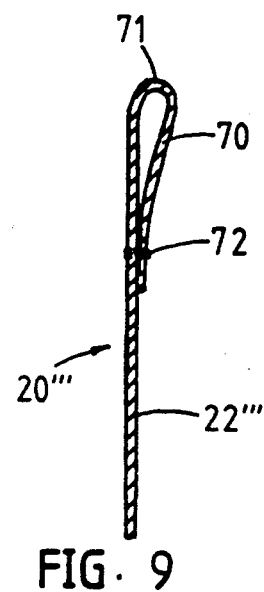
FIG. 9 is a cross-sectional end view of FIG. 8.

FIG. 9 shows a cut out section side view of the embodiment depicted in FIG. 8. The reinforcement 70 is only required for the top edge 71 of the restrainer around the region surrounding the neck of the restrained animal which has the tendency to damage the soft fabric material by biting.

RAMIFICATIONS AND SCOPES

Restrainer assemblies of the present invention can be made of any suitable materials. The sheet material itself is generally prepared from materials having the desired combination of such properties as pliability, resilience, flexibility, weight, density, visual properties, durability, color, smell and non-toxicity.

Examples of suitable materials include, but are not limited to plastic or polymeric sheets, leathers, woven and non-woven fabrics, laminated fabrics, paper products, and metals.

Although the type of fastener members with releasable attachment surfaces described in the preferred embodiment is the hook-and-loop type fastener system, other types of releasable fastener means (e.g. releasable buttons) can also be utilized.

In the preferred embodiments described above, the present restrainer is used as a stand-alone unit. If desired, it can be anchored to other support mechanisms to be held in any desired orientation.

The use and inclusion of the rear supporting strap may be optional in some rare cases. If it is not necessary to lift the restrained animal from a resting surface, and if the animal is semi-tame and does not tend to struggle too violently attempting to escape out of the restrainer, it is possible to do without the rear supporting strap.

However if desired in some instances, more than one rear supporting strap may be utilized, as well as the inclusion of a plurality of fastener members, even different types.

As will become apparent to those skilled in the art, restrainer assemblies of the present invention can be made in any suitable sizes and configurations for its intended use, as applied to animals such as birds, poultry animals, or some other types of small animals.

Although the description above contains many specificities, these should not be construed as limiting the scope of the invention but as merely providing illustrations to some of the presently preferred embodiments of this invention.

Accordingly, the scope of the invention should be determined by the appended claims and their legal equivalents, rather than by the embodiments illustrated.

What is claimed is:

1. A device for restraining avian animals, and other small animals, comprising:
    a sheet of material having a proximal end and a distal end being adapted to be bent or folded in order to overlap portions adjacent the ends of the sheet, thereby forming said sheet into the approximate shape of a truncated cone having two significant openings, one opening being larger than the other, and
    a plurality of fastening means, including,
    first and second fastener members, each of said fastener members having a top attachment surface and a bottom backing surface, said first fastener member having a top attachment surface adapted for releasable engagement with the top attachment surface of said second fastener member, said first fastener member being attached at its said backing surface to a first surface of said sheet close to said proximal end of said sheet, said second fastener member being attached at its said backing surface to said sheet close to the distal end of said sheet and on the opposite second surface of said sheet, and
    third and fourth fastener members of the same kind as said first fastener member, said third fastener member being attached at its backing surface to said sheet some distance to left of center of said sheet, and said fourth fastener member being attached at its backing surface to said sheet some distance to right of center of said sheet, and
    a rear supporting strap made of a compliant or pliable material having an attachment surface adapted for releasable attachment to said third and fourth fastener members,
    whereby said sheet is bent around until portions adjacent to said each of said distal and proximal ends of said sheet overlap substantially, to provide a desire overlap of said first and said second releasable fastener members, forming said sheet into a suitable approximate funnel shape with two significant openings, one opening being smaller than the other, the size of the smaller opening is made larger than a head of an animal but smaller than the body of an animal to be restrained, and the size of the larger opening being proportioned to receive the body of the animal,
    wherein the restrainer sheet is retained in the desired approximate funnel shape by engaging said first and second fastener members having releasable attachment surfaces,
    whereby said restrainer sheet is held above the animal with the larger opening facing downwards, and is rapidly placed over said animal until the head of said animal protrudes out of said smaller opening of said restrainer sheet,
    wherein the rear supporting strap is placed across the larger opening of said restrainer, around the rear of the animal, and fastened to said restrainer sheet by attaching said releasable fastening surface of said strap to said third and fourth fastener members, for the purpose of preventing the animal from backing out of said restrainer sheet.

2. An animal restraining device according to claim 1, wherein said sheet is substantially rectangular in shape.

3. An animal restraining device according to claim 1, wherein said sheet is substantially rectangular in shape, having two longer edges of substantially equal lengths, and two shorter edges of substantially equal lengths, the larger edges being between two to six times longer than the shorter edges.

4. An animal restraining device according to claim 1, wherein said fastening means with releasable attachment surfaces are separable hook and loop type fastening system.

5. An animal restraining device according to claim 1, wherein one end of said rear supporting strap is permanently attached to said sheet.

6. An animal restraining device according to claim 1, wherein said sheet has substantially curved or arcuate edges.

7. An animal restraining device according to claim 1, wherein said sheet has a reinforcement means to strengthen a portion adjacent said smaller opening which is most susceptile to damage by a restrained animal.

8. An animal restraining device according to claim 1, wherein said sheet is made of a clear flexible plastic sheeting material.

9. An animal restraining device according to claim 1, wherein said sheet is made of a pliable fabric material.

10. An animal restraining device according to claim 1, further including a plurality of said rear supporting straps.

11. A device for restraining avian animals, and other small animals, comprising:
    a sheet of material having a proximal end and a distal end being adapted to be bent or folded in order to overlap portions adjacent the ends, thereby forming said sheet into the approximate shape of a truncated cone having two significant openings, one opening being larger than the other, and
    first and second fastener members, each of said fastener members having a top attachment surface and a bottom backing surface, said first fastener member having a top attachment surface adapted for releasable engagement with the top attachment surface of said second fastener member, said first fastener member being attached at its said backing surface to a first surface of said sheet close to said proximal end of said sheet, said second fastener member being attached at its said backing surface to said sheet close to said distal end of said sheet and on the opposite second surface of said sheet, whereby said sheet is bent around until portions adjacent to said proximal and said distal ends of said sheet overlap substantially to provide a desired overlap of said first and said second releasable fastener members in order to form said sheet into a suitable approximate funnel shape with two significant openings, one opening being smaller that the other, the size of the smaller opening is made larger than a head of an animal but smaller than the body of an animal to be restrained, and the size of the larger opening being proportioned to receive the body of the animal, wherein the restrainer sheet is retained in the desired approximate funnel shape by engaging said first and second fastener members having releasable attachment surfaces, whereby said restrainer sheet is held above the animal with the larger opening facing downwards, and is rapidly placed over said animal until the head of said animal protrudes out of said smaller opening of said restrainer sheet.

* * * * *